(12) United States Patent
Chen et al.

(10) Patent No.: US 12,231,299 B2
(45) Date of Patent: Feb. 18, 2025

(54) NETWORK OPTIMIZATION METHODS AND APPARATUS, ELECTRONIC DEVICE AND STORAGE MEDIUM

(71) Applicant: ZTE Corporation, Shenzhen (CN)

(72) Inventors: Jiajun Chen, Shenzhen (CN); Yin Gao, Shenzhen (CN); Zhuang Liu, Shenzhen (CN); Dapeng Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/276,243

(22) PCT Filed: Jun. 14, 2022

(86) PCT No.: PCT/CN2022/098759
§ 371 (c)(1),
(2) Date: Aug. 7, 2023

(87) PCT Pub. No.: WO2023/020086
PCT Pub. Date: Feb. 23, 2023

(65) Prior Publication Data
US 2024/0121161 A1    Apr. 11, 2024

(30) Foreign Application Priority Data

Aug. 20, 2021 (CN) .......................... 202110963030.2

(51) Int. Cl.
*G06F 15/173* (2006.01)
*H04L 41/14* (2022.01)
*H04L 41/16* (2022.01)

(52) U.S. Cl.
CPC .............. *H04L 41/14* (2013.01); *H04L 41/16* (2013.01)

(58) Field of Classification Search
None
See application file for complete search history.

(56) References Cited

U.S. PATENT DOCUMENTS

2020/0015121 A1*  1/2020  Misra ................. H04L 65/752
2021/0014141 A1*  1/2021  Patil .................... H04W 76/25

FOREIGN PATENT DOCUMENTS

CN    111757344 A    10/2020
CN    112291706 A     1/2021
(Continued)

OTHER PUBLICATIONS

Intel Corporation; AI/ML based mobility optimization; Aug. 16-26, 2021; Agenda item: 18.4.3; 3Gpp TSG-RAN WG3 Meeting #113-e; R3-2134471; whole document; (Year: 2021).*
(Continued)

*Primary Examiner* — Wing F Chan
*Assistant Examiner* — Andrew Woo
(74) *Attorney, Agent, or Firm* — Wolf, Greenfield & Sacks, P.C.

(57) ABSTRACT

Disclosed are a network optimization method and apparatus, an electronic device, and a storage medium. The network optimization method may include: sending data analytics request information to a core network; receiving data analytics response information fed back by the core network and determining a model processing result according to an artificial intelligence learning model; and performing a network optimization operation according to the model processing result.

15 Claims, 4 Drawing Sheets

(56) References Cited

FOREIGN PATENT DOCUMENTS

CN 112512059 A 3/2021
WO WO 2021/007019 A1 1/2021
WO WO 2021/074673 A1 4/2021

OTHER PUBLICATIONS

International Search Report and Written Opinion for International Application No. PCT/CN2022/098759, mailed Aug. 31, 2022.
Office Action and Search Report for Japanese Application No. 2024-502676, dated Dec. 24, 2024.
[No. Author Listed], AI/ML based mobility optimization. Intel Corp., 3GPP TSG-RAN WG3 Meeting #113-e., R3-213471. Aug. 16-26, 2021;17 pages.

\* cited by examiner

NETWORK OPTIMIZATION METHODS AND APPARATUS, ELECTRONIC DEVICE AND STORAGE MEDIUM

CROSS-REFERENCE TO RELATED APPLICATION

This application is a national stage filing under 35 U.S.C. § 371 of international application number PCT/CN2022/098759, filed Jun. 14, 2022, which claims priority to Chinese patent application No. 202110963030.2, filed Aug. 20, 2021. The contents of these applications are incorporated herein by reference in their entirety.

TECHNICAL FIELD

The present application relates to the technical field of wireless communication, and more particularly, to a network optimization method and apparatus, an electronic device, and a storage medium.

BACKGROUND

With the development of wireless communication network technologies, fifth-generation wireless communication networks have been implemented, and there are expectations for the development of networks that surpass the fifth-generation wireless communication networks in the future. Artificial Intelligence (AI) technologies, particularly Machine Learning (ML), can provide effective network optimization schemes based on massive data in the fifth-generation wireless communication networks or networks that surpass the fifth-generation communication networks. Currently, a core network has a Network Data Analytics Function (NWDAF) unit, which can provide data analytics services, such as statistics information of historical network activities or prediction information of future network activities. Although the data analytics and prediction functions can bring fundamental changes to communication, the complexity of operation is also significantly increased. Operators need to optimize network deployment, operation, and maintenance to improve network performance and user experience.

SUMMARY

A main objective of embodiments of the present application is to provide a network optimization method and apparatus, an electronic device, and a storage medium, to enable a base station and a core network to exchange data analytics information and make statistics and prediction according to the data analytics information, thereby realizing network optimization on the core network side and the base station side and improving the quality of network communication.

An embodiment of the present application provides a network optimization method. The method includes: sending a data analytics request information to a core network; receiving data analytics response information fed back by the core network and determining a model processing result according to an artificial intelligence learning model; and performing a network optimization operation according to the model processing result.

An embodiment of the present application further provides another network optimization method. The method includes: sending a data information request to a base station; receiving a data information response fed back by the base station, and determining a model processing result according to an artificial intelligence learning model; and performing a network optimization operation according to the model processing result.

An embodiment of the present application further provides a network optimization apparatus. The apparatus includes: a data analytics sending module, configured for sending a data analytics request information to a core network; a data processing module, configured for receiving data analytics response information fed back by the core network and determining a model processing result according to an artificial intelligence learning model; and a network optimization module, configured for performing a network optimization operation according to the model processing result.

An embodiment of the present application further provides a network optimization apparatus. The apparatus includes: a data sending module, configured for sending a data information request to a base station; a result determining module, configured for receiving a data information response fed back by the base station, and determining a model processing result according to an artificial intelligence learning model; and an optimization execution module, configured for performing a network optimization operation according to the model processing result.

An embodiment of the present application further provides an electronic device. The electronic device includes: one or more processors; and a memory, configured for storing one or more programs which, when executed by the one or more processors, cause the one or more processors to implement the network optimization method according to any one of the embodiments of the present application.

An embodiment of the present application further provides a computer-readable storage medium, storing one or more programs which, when executed by one or more processors, cause the one or more processors to implement the network optimization method according to any one of the embodiments of the present application.

In the embodiments of the present application, a data analytics request information is sent to a core network; data analytics response information fed back by the core network is received and a model processing result is determined according to an artificial intelligence learning model; and a corresponding network optimization operation is performed according to the model processing result. Through the exchange of data information with the core network and the use of the artificial intelligence model to determine a model processing result corresponding to the data information, data statistics and/or prediction is realized, thereby increasing the accuracy of network optimization, and improving network performance and user experience.

DETAILED DESCRIPTION

It should be understood that the embodiments described herein are merely used for illustrating the present application, and are not intended to limit the present application.

In the following description, suffixes such as "module", "component", or "unit" used to represent elements are used for facilitate the description of the present application only, and do not have special meanings. Therefore, "module", "component", and "unit" may be used interchangeably.

Figure 1:
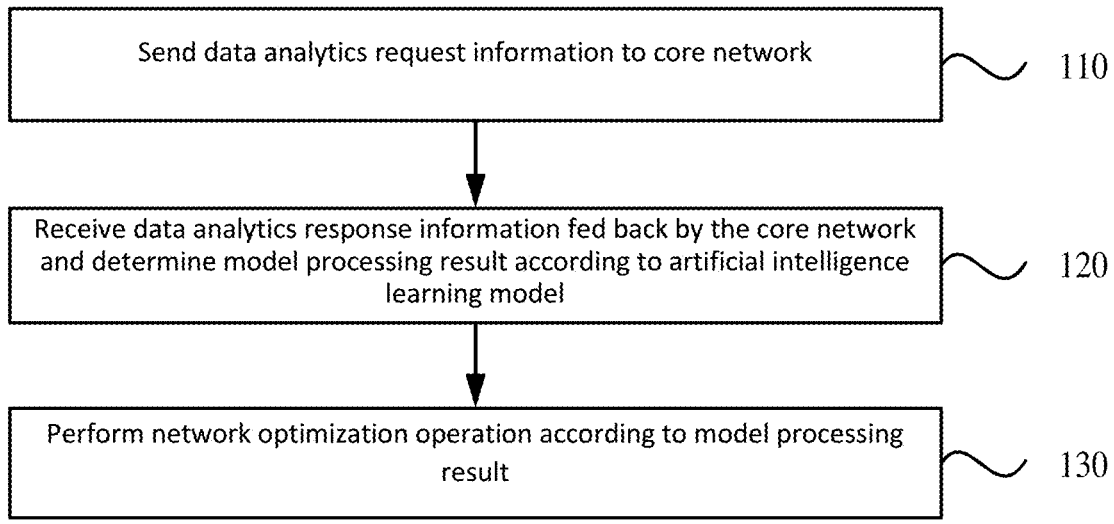
FIG. 1 is a flowchart of a network optimization method according to an embodiment of the present application.

FIG. 1 is a flowchart of a network optimization method according to an embodiment of the present application. This embodiment of the present application may be applied to intelligent network optimization in a wireless communication network. The method may be performed by a network optimization apparatus in the embodiments of the present application. The apparatus may be implemented by software and/or hardware, and generally may be integrated in a node on a base station side. Referring to FIG. 1, the method provided in this embodiment of the present application includes the following steps of S110, S120 and S130.

At S110, a data analytics request information is sent to a core network.

The data analytics request information may be information for controlling the core network and the base station side to exchange data, and may include indication information of a data analytics mode, indication information of data analytics content, and the like. The data analytics request information may be sent to the core network by the node on the base station side.

The node on the base station side may transmit a data analytics request information to the core network, the data analytics request information may include one or more indication information, and the indication information may be used for indicating a method of data analytics, data involved in the analytics, and the like.

At S120, data analytics response information fed back by the core network is received and a model processing result is determined according to an artificial intelligence learning model.

The data analytics response information may be information generated by the core network according to the received data analytics request information. The data analytics response information may include data to be transmitted by the core network side to the base station side. The data analytics response information may correspond to the data analytics request information, for example, if the data analytics request information includes data prediction indication information, the data analytics response information may feed back data related to data prediction. The artificial intelligence learning model may be a pre-trained neural network model, which can process input information. The artificial intelligence learning model may be configured for data statistics, data prediction, and other processing. The model processing result may be an output result of the artificial intelligence learning model, and may include a data prediction result, a data statistics result, and the like.

In an embodiment of the present application, after receiving the data analytics request information, the core network may generate a corresponding data analytics response information, and feed back the data analytics response information to the base station side, for the base station side to process the data analytics response information using the artificial intelligence learning model to generate a model processing result. Depending on different artificial intelligence learning models, the generated model processing result may be prediction information based on the data analytics response information or statistics information based on the data analytics response information.

At S130, a network optimization operation is performed according to the model processing result.

The network optimization operation may be an operation of optimizing the wireless communication network, for example, adjusting traffic load in a cell, adjusting the number of UEs in the cell, adjusting resource usage of the cell, etc.

In an embodiment of the present application, one or more different network optimization policies may be set in advance, a corresponding network optimization policy can be determined according to the model processing result, and a corresponding network optimization operation can be executed according to the determined network optimization policy. It can be understood that the network optimization policy may alternatively be generated in real time according to the model processing result.

In the embodiments of the present application, a data analytics request information is sent to a core network; data analytics response information fed back by the core network is received and a model processing result is determined according to an artificial intelligence learning model; and a corresponding network optimization operation is performed according to the model processing result. Through the exchange of data information with the core network and the use of the artificial intelligence model to determine a model processing result corresponding to the data information, data statistics and/or prediction is realized, thereby increasing the accuracy of network optimization, and improving network performance and user experience.

Further, on the basis of the above embodiments of the present application, the data analytics response information is determined in the core network through at least one of data collection, data statistics and analytics, or data prediction according to the data analytics request information.

In an embodiment of the present application, the data analytics response information may be generated by the core network. The data analytics response information may be information generated through at least one of data collection, data statistics and analytics, or data prediction according to the data analytics request information. It can be understood that, an artificial intelligence learning model may be preset in the core network, the data analytics request information may be processed by the artificial intelligence learning model, and a result of the processing may be used as the data analytics response message.

Figure 2:
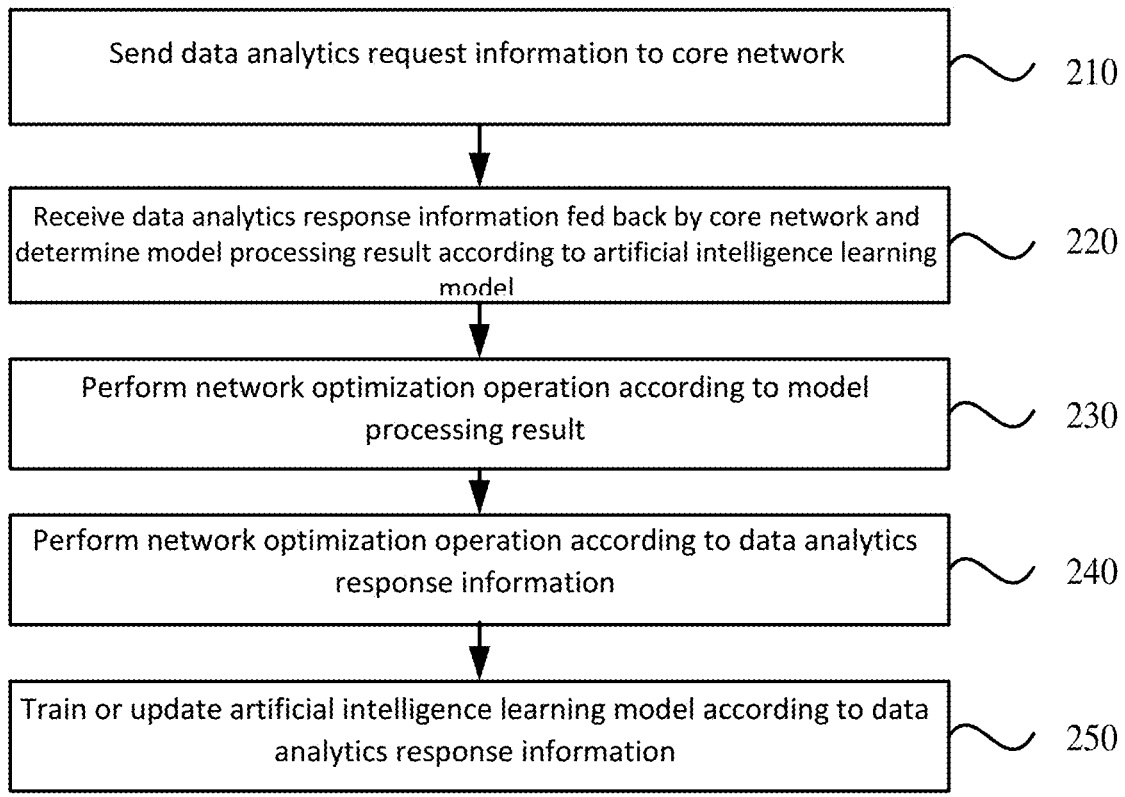
FIG. 2 is a flowchart of another network optimization method according to an embodiment of the present application.

FIG. 2 is a flowchart of another network optimization method according to an embodiment of the present application. This embodiment of the present application is detailed based on the above embodiments of the present application. Referring to FIG. 2, the method provided in this embodiment of the present application includes the following steps of S210, S220, S230, S240 and S250.

At S210, data analytics request information is sent to a core network.

At S220, data analytics response information fed back by the core network is received and a model processing result is determined according to an artificial intelligence learning model.

At S230, a network optimization operation is performed according to the model processing result.

At S240, a network optimization operation is performed according to the data analytics response information.

In an embodiment of the present application, the base station side may also directly perform the network optimization operation according to the data analytics response information. For example, when the data analytics response information is prediction information, the base station side can directly perform the network optimization operation according to the prediction information to improve the network performance.

At S250, the artificial intelligence learning model is trained or updated according to the data analytics response information.

The artificial intelligence learning model may be trained according to the received data analytics response information. The data analytics response information may be information sent by the core network in a historical process. The artificial intelligence learning model may be continuously trained or updated according to the data analytics response information to improve the accuracy of the model processing result. It can be understood that the updating or training of the artificial intelligence learning model may be performed every time the data analytics response information is received, or the updating or training of the artificial intelligence learning model may be performed when a data volume of the received data analytics response information is greater than a data volume threshold.

In an embodiment of the present application, a data analytics request information is sent to a core network; a data response information fed back by the core network is received and a model processing result is determined according to an artificial intelligence learning model; a corresponding network optimization operation is performed according to the model processing result; a network optimization operation is performed according to the data response information; and the artificial intelligence learning model is trained or updated according to the data response information. Thus, the accuracy of network optimization is further increased, and network performance and user experience are improved.

Further, on the basis of the above embodiments of the present application, the data analytics request information includes at least one of: at least one analytics data type identifier, at least one data analytics form identifier, at least one User Equipment (UE) identifier, data analytics time information, an area of interest for data analytics, or an expected UE trajectory information granularity.

The analytics data type identifier may indicate a type of data analytics requested, and may have different values to identify different data types. The data analytics form identifier may indicate a form of data analytics, and may have different values to identify different data analytics forms. The data analytics forms may include data statistics, data prediction, and the like. The UE identifiers may identify different UEs. The data analytics time information may indicate a time period during which the data analytics is performed and may include a start time and an end time of the time period. The area of interest for data analytics may represent an area of interest to data analytics, for example, a tracking area, a cell list, and the like. The expected UE trajectory information granularity may indicate a minimum analytics granularity for UE trajectories in data analytics.

In an embodiment of the present application, the data analytics request information may include one or more of the analytics data type identifier, the data analytics form identifier, the UE identifier, the data analytics time information, the area of interest for data analytics, and the expected UE trajectory information granularity. It can be understood that the number of pieces of each type of information included in the data analytics request information may be one or more. For example, the data analytics request information may include a plurality of analytics data type identifiers and a plurality of data analytics form identifiers.

Further, on the basis of the above embodiments of the present application, the analytics data type identifier includes at least one of: a UE data type identifier, a network load data type identifier, a quality of experience data type identifier, a network slice data type identifier, and a general data type identifier.

The analytics data type identifier may include the UE data type identifier, the network load data type identifier, the quality of experience data type identifier, the network slice data type identifier, the general data type identifier, and the like. Different identifiers have different values, and can respectively identify UE data, network load data, Quality of Experience (QoE) data, network slice data, general data, and the like.

Further, on the basis of the above embodiments of the present application, the data analytics form identifier includes at least one of: a data statistics identifier, or a data prediction identifier.

The data analytics form identifier may include the data statistics identifier and the data prediction identifier. The data statistics identifier may identify data on the base station side, for which the core network side needs to perform data statistics. The data prediction identifier may identify data on the base station side, for which the core network side needs to perform data prediction.

Further, on the basis of the above embodiments of the present application, the data analytics time information includes at least one of: a time granularity, a data analytics start time, or a data analytics end time.

In an embodiment of the present application, the data analytics time information may include the time granularity, the data analytics start time, the data analytics end time, and the like, and may indicate a time period during which the data analytics is performed. The time granularity may be a length of the time period during which the data analytics is performed.

Further, on the basis of the above embodiments of the present application, the area of interest for data analytics includes at least one of: a tracking area, a cell list, or a paging area.

In an embodiment of the present application, the area of interest for data analytics may be a tracking area, a cell list, a paging area, and the like.

Further, on the basis of the above embodiments of the present application, the expected UE trajectory information granularity includes at least one of: a tracking area level, a cell level, or a geographic location level.

The expected UE trajectory information granularity may be an expected granularity of UE trajectory information, and may be a tracking area level (TA Level), a cell level, a geographic location level (latitude and longitude), and the like.

Further, on the basis of the above embodiments of the present application, the data analytics response information includes at least one of: UE mobility statistics information, UE mobility prediction information, network load statistics information, network load prediction information, or general data statistics information.

In an embodiment of the present application, as the content of the data analytics request information varies, the data analytics response information generated by the core network may include one or more of the UE mobility statistics information, the UE mobility prediction information, the network load statistics information, the network load prediction information, and the general data statistics information. The UE mobility statistics information may be statistics information of locations of one or more UEs at different times. The UE mobility prediction information may be statistics information of predicted locations of one or more UEs at a future time point or in a future time period. The network load statistics information may be statistics information of network load at a time point or in a time period. The network load prediction information may be statistics information of network load at a future time point or in a future time period. The general data statistics information may be statistics information of general data, for example, map information of an area of interest, a movement direction of a UE, and the like.

Further, on the basis of the above embodiments of the present application, the UE mobility statistics information includes at least one of: coordinates of a geographic location of a UE, an identifier of a cell on which the UE camps, a tracking area in which the UE is located, identification information of a beam through which the UE connects to the cell, time information of access to the cell by the UE, time information of access to the tracking area by the UE, a movement direction of the UE, a movement speed of the UE, map information of a local area, or map information of an area of interest.

Further, on the basis of the above embodiments of the present application, the UE mobility prediction information includes at least one of: coordinates of a predicted geographic location of the UE, an identifier of a cell on which the UE is to camp, a tracking area in which the UE is to be located, time information of future access to the cell by the UE, time information of future access to the tracking area by the UE, or a confidence degree.

In an embodiment of the present application, the UE mobility prediction information may include the coordinates of the predicted geographic location of the UE, the identifier of the cell on which the UE is to camp, the tracking area in which the UE is to be located, the time information of future access to the cell by the UE, the time information of future access to the tracking area by the UE, and corresponding confidence degrees. It can be understood that each type of information in the UE mobility prediction information may have a corresponding confidence degree.

Further, on the basis of the above embodiments of the present application, the network load statistics information includes at least one of: a traffic load in a cell, a number of UEs accessing the cell, a Physical Resource Block (PRB) usage of the cell, or a Packet Data Convergence Protocol (PDCP) data volume of the cell.

Further, on the basis of the above embodiments of the present application, the network load prediction information includes at least one of: a predicted traffic load in a cell, a predicted number of UEs that are to access the cell, a predicted PRB usage of the cell, a predicted PDCP data volume of the cell, or a confidence degree.

Further, on the basis of the above embodiments of the present application, the general data statistics information includes at least one of: map information of a local area, map information of an area of interest, an average movement speed of a UE, or a movement direction of the UE.

Figure 3:
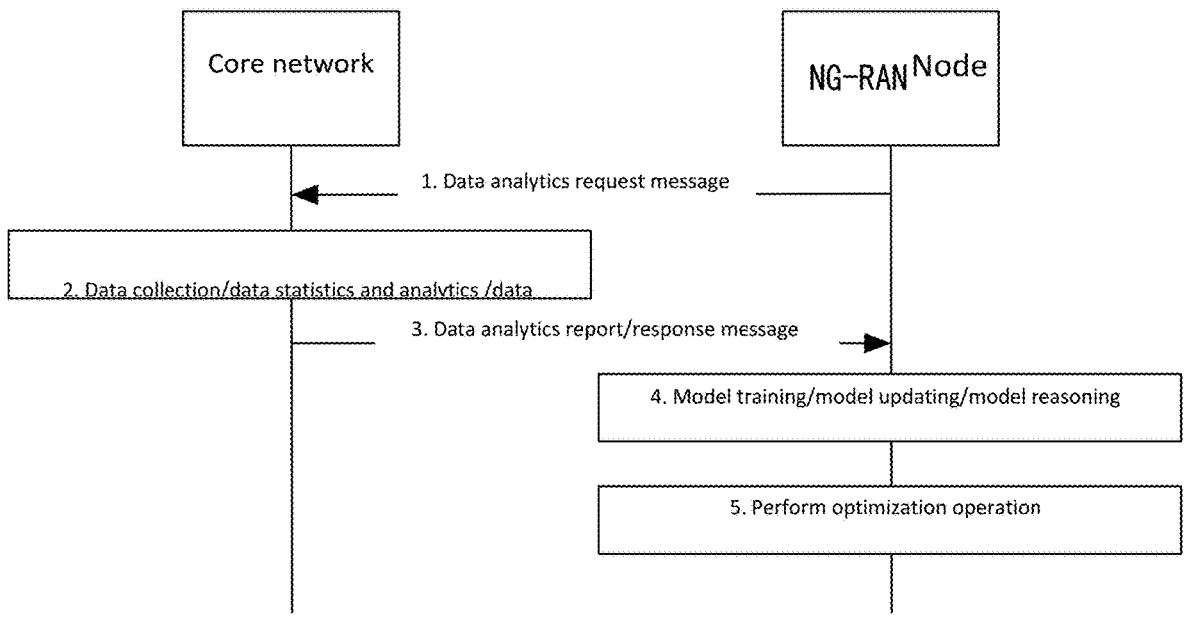
FIG. 3 is an example diagram of a network optimization method according to an embodiment of the present application.

In an implementation, FIG. 3 is an example diagram of a network optimization method according to an embodiment of the present application. Referring to FIG. 3, a process for an RAN side to acquire analytics data or prediction data of a core network to perform network optimization may include the following steps of S1, S2, S3, S4 and S5.

At S1, an NG-RAN node sends a data analytics request message (DATA ANALYTICS INFORMATION REQUEST) to the core network for indicating requested AI data analytics information to the core network. The request message includes one or more of: one or more analytics data type identifiers, for indicating a type of data analytics requested, such as UE-related type data, network load-related type data, QoE-related type data, network slice-related type data, general data type (including map information), and the like; one or more data analytics form identifiers, for indicating a data analytics form, such as a data statistics form or a prediction information form; one or more UE identifiers (UE IDs); a time period during which data analytics is performed, including one or more of a time granularity, a start time of a data analytics report, and an end time of the data analytics report; an area of interest for data analytics, for example, a tracking area, a cell list, a paging area, and the like; or an expected UE trajectory information granularity, for example, a tracking area level (TA Level), a cell level, a geographic location level (latitude and longitude), and the like.

At S2, the core network performs data collection according to an indication of the received data analytics request message and generates a data report requested in the request message.

At S3, the core network sends a data analytics report/response message (Data ANALYTICS INFORMATION REPORT/RESPONSE) to the NG-RAN node, where the message includes a message requested by the NG-RAN node.

If the request message indicates UE-related data in the data statistics form, the data analytics report/response message includes UE mobility statistics information. The UE mobility statistics information includes statistics information of locations of one or more UEs at a time point or in a time period, and may be one or more of: coordinates of a geographic location of a UE, for example, latitude and longitude; an identifier of a cell on which the UE camps; a tracking area (TA) in which the UE is located; identification information of a beam through which the UE connects to the cell, time information of access to the cell by the UE; a time point at which or a duration for which the UE enters a cell or a tracking area; a movement direction of the UE; a movement speed of the UE; and map information of a local area or an area of interest.

If the request message includes requesting UE-related data in the prediction information form, the data analytics report/response message includes UE mobility prediction information (UE mobility predictions). The UE mobility prediction information includes prediction information of locations of one or more UEs at a future time point or in a future time period, and may be one or more of: coordinates of a predicted geographic location of a UE, for example, latitude and longitude; an identifier of a predicted cell on which the UE is to camp; a predicted tracking area (TA) in which the UE is to be located; a time point at which or a duration for which the UE is to enter a cell or a tracking area; a confidence degree or accuracy of the prediction information.

If the request message includes requesting network load-related data in the statistics information form, the data analytics report/response message includes network load statistics information (Load statistics). The network load statistics information includes statistics information of network load at a time point or in a time period, and may be one or more of: a traffic load in a cell, a number of UEs accessing the cell, a Physical Resource Block (PRB) usage of the cell, and a Packet Data Convergence Protocol (PDCP) data volume of the cell.

If the request message includes requesting network load-related data in the prediction information form, the data analytics report/response message includes network load prediction information (Load predictions). The network load prediction information includes prediction information of network load of one or more NG-RAN nodes or cells at a future time point or in a future time period, and may be one or more of: a predicted traffic load in a cell, a predicted number of UEs accessing the cell, a predicted PRB usage of the cell, a predicted PDCP data volume of the cell, and a confidence degree or accuracy of the prediction information.

If the request message includes requesting data of the general data type, the data analytics report message includes one or more of: map information of a local area or an area of interest, an average movement speed of a UE, a movement direction of the UE, and the like.

At S4, the NG-RAN node receives the data analytics report from the core network and executes ML model training or ML model reasoning.

At S5, the NG-RAN node performs network optimization according to the data analytics report from the core network or a result of the ML model reasoning.

Figure 4:
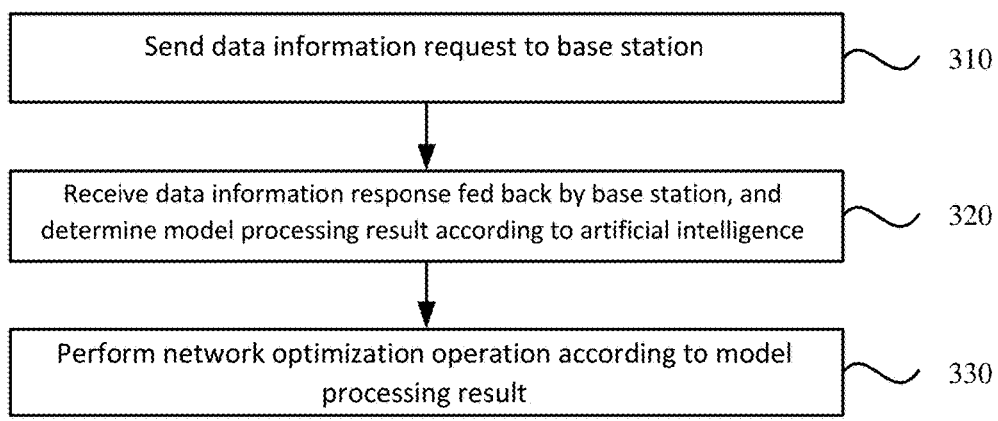
FIG. 4 is a flowchart of a network optimization method according to an embodiment of the present application.

FIG. 4 is a flowchart of a network optimization method according to an embodiment of the present application. This embodiment of the present application may be applied to intelligent network optimization in a wireless communication network. The method may be performed by a network optimization apparatus in the embodiments of the present application. The apparatus may be implemented by software and/or hardware, and generally may be integrated in a node on a core network side. Referring to FIG. 4, the method provided in this embodiment of the present application includes the following steps of S310, S320 and S330.

At S310, a data information request is sent to a base station.

The data information request may be request information used by the core network to acquire data from the base station side, and may include indication information of a data analytics mode, indication information of data analytics content, and the like. The data information request may be sent to a node on the base station side by a core network device.

In an embodiment of the present application, the core network may send a data information request to the base station side, where the data information request may instruct to acquire one or more types of data from the base station side. The core network may acquire data from the base station side by sending the data information request to the base station.

At S320, a data information response fed back by the base station is received, and a model processing result is determined according to an artificial intelligence learning model.

The data information response may be response information generated by the base station side according to the data information request, and may include data requested. There may be a correspondence between the data information response and the data information request. The artificial intelligence learning model may be a pre-trained neural network model, which can process input information. The artificial intelligence learning model may be configured for data statistics, data prediction, and other processing. The model processing result may be an output result of the artificial intelligence learning model, and may include a data prediction result, a data statistics result, and the like.

In an embodiment of the present application, after receiving the data information request, the node on the base station side may generate a corresponding data information response and feed back the data information response to the core network. The core network may process the data information response according to the artificial intelligence learning model to generate the model processing result. Depending on different artificial intelligence learning models, the generated model processing result may be prediction information based on the data information response, statistics information based on the data information response, or the like.

At S330, a network optimization operation is performed according to the model processing result.

In an embodiment of the present application, one or more different network optimization policies may be set in advance, a corresponding network optimization policy can be determined according to the model processing result, and a corresponding network optimization operation can be executed according to the determined network optimization policy. It can be understood that the network optimization policy may alternatively be generated in real time according to the model processing result.

In the embodiments of the present application, a data analytics request information is sent to a core network; data analytics response information fed back by the core network is received and a model processing result is determined according to an artificial intelligence learning model; and a corresponding network optimization operation is performed according to the model processing result. Through the exchange of data information with the core network and the use of the artificial intelligence model to determine a model processing result corresponding to the data information, data statistics and/or prediction is realized, thereby increasing the accuracy of network optimization, and improving network performance and user experience.

Further, on the basis of the above embodiments of the present application, the data information response is determined by the base station through at least one of data collection, data statistics and analytics, or data prediction according to the data information request.

In an embodiment of the present application, the data information response received by the core network may be generated by the base station. The data information response is generated by the base station through one or more of data collection, data statistics and analytics, and data prediction according to the data information request.

Figure 5:
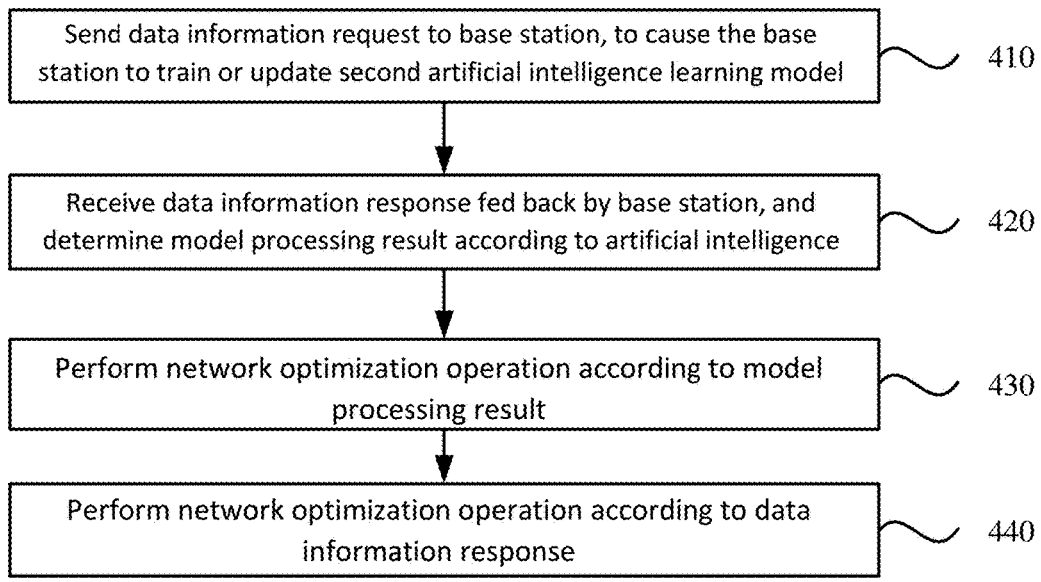
FIG. 5 is an example diagram of another network optimization method according to an embodiment of the present application.

FIG. 5 is an example diagram of another network optimization method according to an embodiment of the present application. This embodiment of the present application is detailed based on the above embodiments of the present application. Referring to FIG. 5, the method provided in this embodiment of the present application includes the following steps of S410, S420, S430 and S440.

At S410, a data information request is sent to a base station, to cause the base station to train or update a second artificial intelligence learning model.

The second artificial intelligence learning model may be an artificial intelligence learning model deployed in the base station, and may be, for example, a neural network model. The artificial intelligence learning model in the core network may have a different type and structure from the second artificial intelligence learning model in the base station. For example, the artificial intelligence learning model in the core network may process data having low impact on the real-time performance of the UE, and the second artificial intelligence learning module may process data having great impact on the real-time performance of the UE, such as network load, QoE data, etc.

In an embodiment of the present application, the core network may send the data information request to the base station, for the base station to train or update the second artificial intelligence learning model in the base station according to the data information request, so as to increase the accuracy of the data information response fed back by the base station, thereby further improving the network optimization effect.

At S420, a data information response fed back by the base station is received, and a model processing result is determined according to an artificial intelligence learning model At S430, a network optimization operation is performed according to the model processing result.

At S440, a network optimization operation is performed according to the data information response.

The core network may directly select and perform a corresponding network optimization operation according to the data information response fed back by the base station side.

According to an embodiment of the present application, a data information request is sent to a base station, to cause the base station to train or update a second artificial intelligence learning model; a data information response fed back by the base station is received, and the data information response is processed using an artificial intelligence model to generate a model processing result; and a corresponding network optimization operation is performed according to the model processing result and/or the data information response respectively. Thus, the accuracy of network optimization is increased, and network performance and user experience are improved.

Further, on the basis of the above embodiments of the present application, the data information request includes at least one of: at least one analytics data type identifier, at least one data analytics form identifier, at least one user equipment (UE) identifier, data analytics time information, an area of interest for data analytics, or an expected UE trajectory information granularity.

Further, on the basis of the above embodiments of the present application, the analytics data type identifier includes at least one of: a UE data type identifier, a network load data type identifier, a quality of experience data type identifier, a network slice data type identifier, or a general data type identifier.

Further, on the basis of the above embodiments of the present application, the data analytics form identifier includes at least one of: a data statistics identifier, or a data prediction identifier.

Further, on the basis of the above embodiments of the present application, the data analytics time information includes at least one of: a time granularity, a data analytics start time, or a data analytics end time.

Further, on the basis of the above embodiments of the present application, the area of interest for data analytics includes at least one of: a tracking area, a cell list, or a paging area.

Further, on the basis of the above embodiments of the present application, the expected UE trajectory information granularity includes at least one of: a tracking area level, a cell level, or a geographic location level.

Further, on the basis of the above embodiments of the present application, the data information response includes at least one of: UE mobility statistics information, UE mobility prediction information, network load statistics information, network load prediction information, or general data statistics information.

Further, on the basis of the above embodiments of the present application, the UE mobility statistics information includes at least one of: coordinates of a geographic location of a UE, an identifier of a cell on which the UE camps, a tracking area in which the UE is located, identification information of a beam through which the UE connects to the cell, time information of access to the cell by the UE, time information of access to the tracking area by the UE, a movement direction of the UE, a movement speed of the UE, map information of a local area, or map information of an area of interest.

Further, on the basis of the above embodiments of the present application, the UE mobility prediction information includes at least one of: coordinates of a predicted geographic location of the UE, an identifier of a cell on which the UE is to camp, a tracking area in which the UE is to be located, time information of future access to the cell by the UE, time information of future access to the tracking area by the UE, or a confidence degree.

Further, on the basis of the above embodiments of the present application, the network load statistics information includes at least one of: a traffic load in a cell, a number of UEs accessing the cell, a Physical Resource Block (PRB) usage of the cell, or a Packet Data Convergence Protocol (PDCP) data volume of the cell.

Further, on the basis of the above embodiments of the present application, the network load prediction information includes at least one of: a predicted traffic load in a cell, a predicted number of UEs that are to access the cell, a predicted PRB usage of the cell, a predicted PDCP data volume of the cell, or a confidence degree.

Further, on the basis of the above embodiments of the present application, the general data statistics information includes at least one of: map information of a local area, and map information of an area of interest, an average movement speed of a UE, or a movement direction of the UE.

Figure 6:
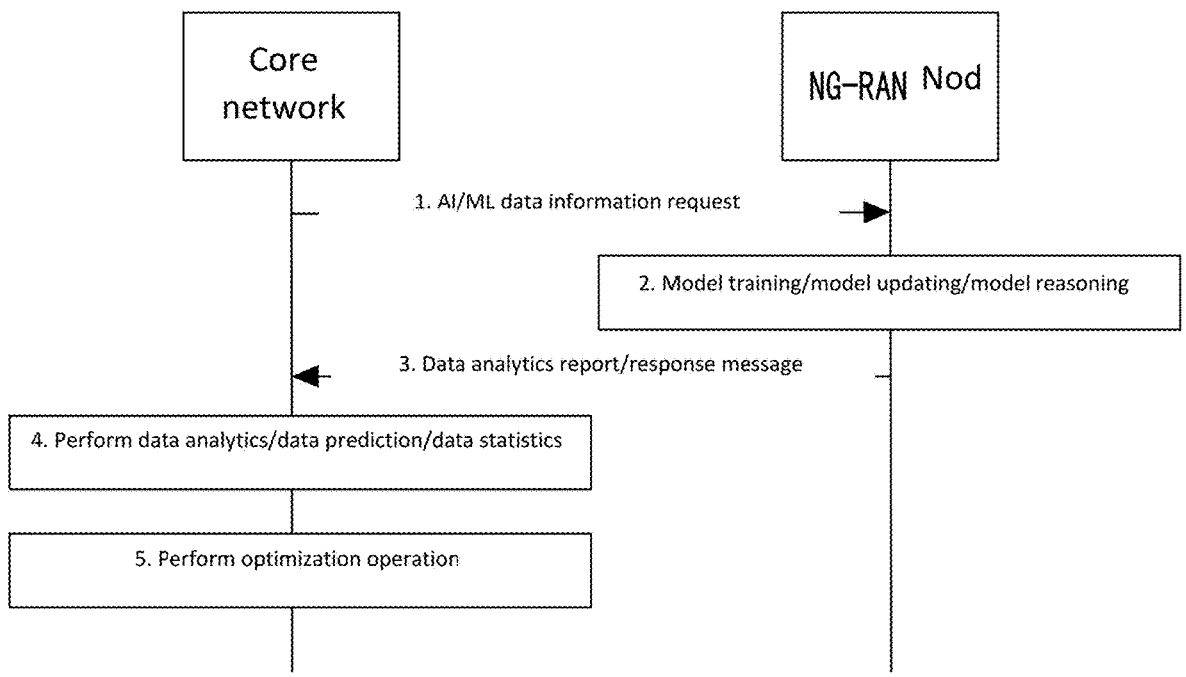
FIG. 6 is an example diagram of a network optimization method according to an embodiment of the present application.

In an implementation, FIG. 6 is an example diagram of a network optimization method according to an embodiment of the present application. Referring to FIG. 6, in an example where a core network acquires prediction information of an NG-RAN node and performs network optimization, the network optimization method may include the following steps of S1, S2, S3, S4 and S5.

At S1, the core network sends an artificial intelligence/machine learning data information request message (AI/ML DATA INFORMATION REQUEST) to the NG-RAN node for indicating required AI information to the NG-RAN node. The request message includes one or more of: one or more analytics data type identifiers, for indicating a type of data analytics requested, such as UE-related type data, network load-related type data, QoE-related type data, network slice-related type data, general data type (including map information), and the like; one or more data analytics form identifiers, for indicating a data analytics form, such as a data statistics form or a prediction information form; one or more UE identifiers (UE IDs); a time period during which data analytics is performed, including one or more of a time granularity, a start time of a data analytics report, and an end time of the data analytics report; an area of interest for data analytics, for example, a tracking area, a cell list, a paging area, and the like; or an expected UE trajectory information granularity, for example, a tracking area level (TA Level), a cell level, a geographic location level (latitude and longitude), and the like.

At S2, the NG-RAN node performs data collection, model training, or model reasoning according to an indication of the received data analytics request message and generates a data report requested in the request message.

At S3, the NG-RAN node sends an AI/ML data information report/response message (AI/ML Information Report/Response) to the core network, where the message includes the information requested by the core network.

If the request message indicates UE-related data in the data statistics form, the data analytics report/response message includes UE mobility statistics information. The UE mobility statistics information includes statistics information of locations of one or more UEs at a time point or in a time period, and may be one or more of: coordinates of a geographic location of a UE, for example, latitude and longitude; an identifier of a cell on which the UE camps; a tracking area (TA) in which the UE is located; identification information of a beam through which the UE connects to the cell, time information of access to the cell by the UE; a time point at which or a duration for which the UE enters a cell or a tracking area; a movement direction of the UE; a movement speed of the UE; and map information of a local area or an area of interest.

If the request message includes requesting UE-related data in the prediction information form, the data analytics report/response message includes UE mobility prediction information (UE mobility predictions). The UE mobility prediction information includes prediction information of locations of one or more UEs at a future time point or in a future time period, and may be one or more of: coordinates of a predicted geographic location of a UE, for example, latitude and longitude; an identifier of a predicted cell on which the UE is to camp; a predicted tracking area (TA) in which the UE is to be located; a time point at which or a duration for which the UE is to enter a cell or a tracking area; a confidence degree or accuracy of the prediction information.

If the request message includes requesting network load-related data in the statistics information form, the data analytics report/response message includes network load statistics information (Load statistics). The network load statistics information includes statistics information of network load at a time point or in a time period, and may be one or more of: a traffic load in a cell, a number of UEs accessing the cell, a Physical Resource Block (PRB) usage of the cell, and a PDCP data volume of the cell.

If the request message includes requesting network load-related data in the prediction information form, the data analytics report/response message includes network load prediction information (Load predictions). The network load prediction information includes prediction information of network load of one or more NG-RAN nodes or cells at a future time point or in a future time period, and may be one or more of: a predicted traffic load in a cell, a predicted number of UEs accessing the cell, a predicted PRB usage of the cell, a predicted PDCP data volume of the cell, and a confidence degree or accuracy of the prediction information.

If the request message includes requesting data of the general data type, the data analytics report message includes one or more of: map information of a local area or an area of interest, an average movement speed of a UE, a movement direction of the UE, and the like.

At S4, the core network obtains the data analytics report from the NG-RAN node, and performs data analytics, data prediction, and data statistics.

At S5, the core network performs network optimization according to the data analytics report from the NG-RAN node or a data analytics report from the core network.

Figure 7:
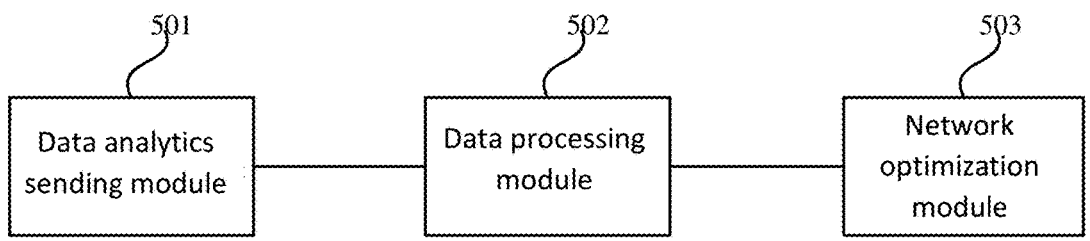
FIG. 7 is a schematic structural diagram of a network optimization apparatus according to an embodiment of the present application.

FIG. 7 is a schematic structural diagram of a network optimization apparatus according to an embodiment of the present application. The apparatus can implement the network optimization method provided in any embodiment of the present application, and has functional modules and beneficial effects corresponding to the method implemented. The apparatus may be implemented by software and/or hardware, and is generally integrated in a base station. The apparatus includes a data analytics sending module 501, a data processing module 502, and a network optimization module 503.

The data analytics sending module 501 is configured for sending a data analytics request information to a core network.

The data processing module 502 is configured for receiving data analytics response information fed back by the core network and determining a model processing result according to an artificial intelligence learning model.

The network optimization module 503 is configured for performing a network optimization operation according to the model processing result.

In the embodiments of the present application, the data analytics sending module sends a data analytics request information to a core network; the data processing module receives data analytics response information fed back by the core network and determines a model processing result according to an artificial intelligence learning model; and the network optimization module performs a corresponding network optimization operation according to the model processing result. Through the exchange of data information with the core network and the use of the artificial intelligence model to determine a model processing result corresponding to the data information, data statistics and/or prediction is realized, thereby increasing the accuracy of network optimization, and improving network performance and user experience.

Further, on the basis of the above embodiments of the present application, the apparatus further includes: a second network optimization module, configured for performing a network optimization operation according to the data analytics response information.

Further, on the basis of the above embodiments of the present application, in the apparatus, the data analytics response information is determined in the core network through at least one of data collection, data statistics and analytics, or data prediction according to the data analytics request information.

Further, on the basis of the above embodiments of the present application, in the apparatus, the data analytics request information includes at least one of: at least one analytics data type identifier, at least one data analytics form identifier, at least one user equipment (UE) identifier, data analytics time information, an area of interest for data analytics, or an expected UE trajectory information granularity.

Further, on the basis of the above embodiments of the present application, in the apparatus, the analytics data type identifier includes at least one of: a UE data type identifier, a network load data type identifier, a quality of experience data type identifier, a network slice data type identifier, or a general data type identifier.

Further, on the basis of the above embodiments of the present application, the data analytics form identifier includes at least one of: a data statistics identifier or a data prediction identifier.

Further, on the basis of the above embodiments of the present application, in the apparatus, the data analytics time information includes at least one of: a time granularity, a data analytics start time, or a data analytics end time.

Further, on the basis of the above embodiments of the present application, in the apparatus, the area of interest for data analytics includes at least one of: a tracking area, a cell list, or a paging area.

Further, on the basis of the above embodiments of the present application, in the apparatus, the expected UE trajectory information granularity includes at least one of: a tracking area level, a cell level, or a geographic location level.

Further, on the basis of the above embodiments of the present application, in the apparatus, the data analytics response information includes at least one of: UE mobility statistics information, UE mobility prediction information, network load statistics information, network load prediction information, or general data statistics information.

Further, on the basis of the above embodiments of the present application, in the apparatus, the UE mobility statistics information includes at least one of: coordinates of a geographic location of a UE, an identifier of a cell on which the UE camps, a tracking area in which the UE is located, identification information of a beam through which the UE connects to the cell, time information of access to the cell by the UE, time information of access to the tracking area by the UE, a movement direction of the UE, a movement speed of the UE, map information of a local area, or map information of an area of interest.

Further, on the basis of the above embodiments of the present application, in the apparatus, the UE mobility prediction information includes at least one of: coordinates of a predicted geographic location of the UE, an identifier of a cell on which the UE is to camp, a tracking area in which the UE is to be located, time information of future access to the cell by the UE, time information of future access to the tracking area by the UE, or a confidence degree.

Further, on the basis of the above embodiments of the present application, the network load statistics information includes at least one of: a traffic load in a cell, a number of UEs accessing the cell, a Physical Resource Block (PRB) usage of the cell, and a Packet Data Convergence Protocol (PDCP) data volume of the cell.

Further, on the basis of the above embodiments of the present application, in the apparatus, the network load prediction information includes at least one of: a predicted traffic load in a cell, a predicted number of UEs that are to access the cell, a predicted PRB usage of the cell, a predicted PDCP data volume of the cell, or a confidence degree.

Further, on the basis of the above embodiments of the present application, in the apparatus, the general data statistics information includes at least one of: map information of a local area, map information of an area of interest, an average movement speed of a UE, or a movement direction of the UE.

Further, on the basis of the above embodiments of the present application, the apparatus further includes a model training model, configured for training or updating the artificial intelligence learning model according to the data analytics response information.

Figure 8:
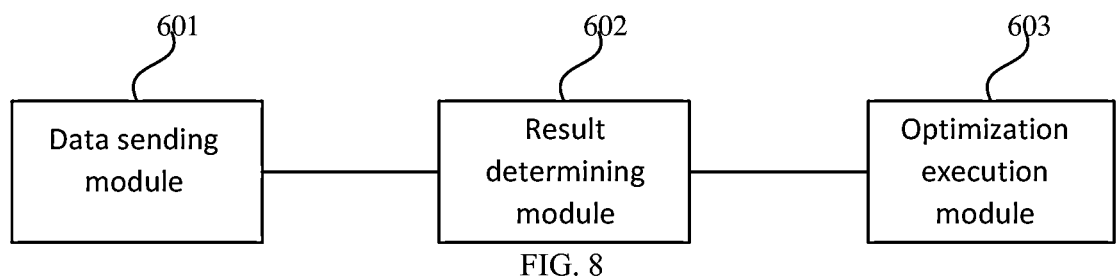
FIG. 8 is a schematic structural diagram of another network optimization apparatus according to an embodiment of the present application.

FIG. 8 is a schematic structural diagram of another network optimization apparatus according to an embodiment of the present application. The apparatus can implement the network optimization method provided in any embodiment of the present application, and has functional modules and beneficial effects corresponding to the method implemented. The apparatus may be implemented by software and/or hardware, and is generally integrated in a core network device. The apparatus includes a data sending module 601, a result determining module 602, and an optimization execution module 603.

The data sending module 601 is configured for sending a data information request to a base station.

The result determining module 602 is configured for receiving a data information response fed back by the base station, and determining a model processing result according to an artificial intelligence learning model.

The optimization execution module 603 is configured for performing a network optimization operation according to the model processing result. In the embodiments of the present application, the data sending module sends a data analytics request information to a core network; the result determining module receives data analytics response information fed back by the core network and determines a model processing result according to an artificial intelligence learning model; and the optimization execution module performs a corresponding network optimization operation according to the model processing result. Through the exchange of data information with the core network and the use of the artificial intelligence model to determine a model processing result corresponding to the data information, data statistics and/or prediction is realized, thereby increasing the accuracy of network optimization, and improving network performance and user experience.

Further, on the basis of the above embodiments of the present application, the apparatus further includes an information optimization module, configured for performing a network optimization operation according to the data information response.

Further, on the basis of the above embodiments of the present application, in the apparatus, the data information response is determined by the base station through at least one of data collection, data statistics and analytics, or data prediction according to the data information request.

Further, on the basis of the above embodiments of the present application, in the apparatus, the data information request includes at least one of: at least one analytics data type identifier, at least one data analytics form identifier, at least one user equipment (UE) identifier, data analytics time information, an area of interest for data analytics, or an expected UE trajectory information granularity.

Further, on the basis of the above embodiments of the present application, in the apparatus, the analytics data type identifier includes at least one of: a UE data type identifier, a network load data type identifier, a quality of experience data type identifier, a network slice data type identifier, or a general data type identifier.

Further, on the basis of the above embodiments of the present application, the data analytics form identifier includes at least one of: a data statistics identifier, or a data prediction identifier.

Further, on the basis of the above embodiments of the present application, in the apparatus, the data analytics time information includes at least one of: a time granularity, a data analytics start time, or a data analytics end time.

Further, on the basis of the above embodiments of the present application, in the apparatus, the area of interest for data analytics includes at least one of: a tracking area, a cell list, or a paging area.

Further, on the basis of the above embodiments of the present application, in the apparatus, the expected UE trajectory information granularity includes at least one of: a tracking area level, a cell level, or a geographic location level.

Further, on the basis of the above embodiments of the present application, in the apparatus, the data information response includes at least one of: UE mobility statistics information, UE mobility prediction information, network load statistics information, network load prediction information, or general data statistics information.

Further, on the basis of the above embodiments of the present application, in the apparatus, the UE mobility statistics information includes at least one of: coordinates of a geographic location of a UE, an identifier of a cell on which the UE camps, a tracking area in which the UE is located, identification information of a beam through which the UE connects to the cell, time information of access to the cell by the UE, time information of access to the tracking area by the UE, a movement direction of the UE, a movement speed of the UE, map information of a local area, or map information of an area of interest.

Further, on the basis of the above embodiments of the present application, in the apparatus, the UE mobility prediction information includes at least one of: coordinates of a predicted geographic location of the UE, an identifier of a cell on which the UE is to camp, a tracking area in which the UE is to be located, time information of future access to the cell by the UE, time information of future access to the tracking area by the UE, or a confidence degree.

Further, on the basis of the above embodiments of the present application, the network load statistics information includes at least one of: a traffic load in a cell, a number of UEs accessing the cell, a Physical Resource Block (PRB) usage of the cell, and a Packet Data Convergence Protocol (PDCP) data volume of the cell.

Further, on the basis of the above embodiments of the present application, in the apparatus, the network load prediction information includes at least one of: a predicted traffic load in a cell, a predicted number of UEs that are to access the cell, a predicted PRB usage of the cell, a predicted PDCP data volume of the cell, or a confidence degree.

Further, on the basis of the above embodiments of the present application, in the apparatus, the general data statistics information includes at least one of: map information of a local area, map information of an area of interest, an average movement speed of a UE, or a movement direction of the UE.

Further, on the basis of the above embodiments of the present application, the data sending module 601 is further configured for: sending the data information request to the base station, to cause the base station to train or update a second artificial intelligence learning model.

Figure 9:
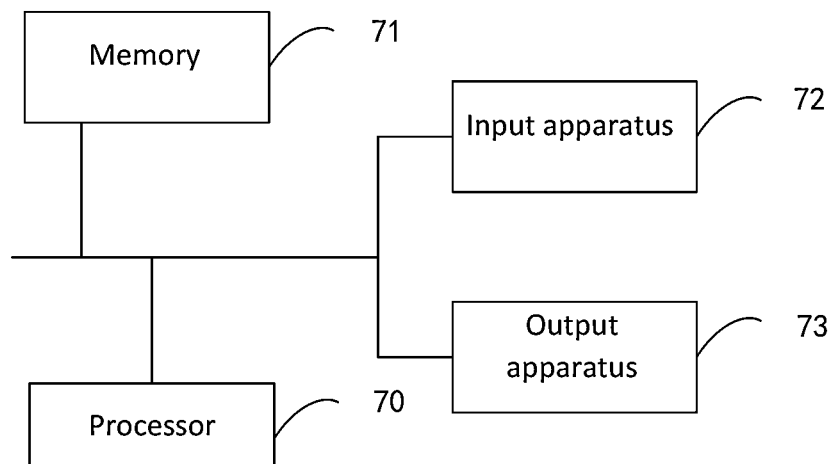
FIG. 9 is a schematic structural diagram of an electronic device according to an embodiment of the present application.

FIG. 9 is a schematic structural diagram of an electronic device according to an embodiment of the present application. The electronic device includes a processor 70, a memory 71, an input apparatus 72, and an output apparatus 73. The electronic device may include one or more processors 70. In FIG. 9, one processor 70 is taken as an example. The processor 70, the memory 71, the input apparatus 72, and the output apparatus 73 in the electronic device may be connected by a bus or in other ways. Connection by a bus is used as an example in FIG. 9.

The memory 71, as a computer-readable storage medium, may be configured for storing a software program, a computer-executable program, and modules, for example, corresponding modules in the network optimization apparatus in the embodiments of the present application (the data analytics sending module 501, the data processing module 502, and the network optimization module 503; or the data sending module 601, the result determining module 602, and the optimization execution module 603. Software programs, instructions, and modules stored in the memory 71, when executed by the processor 70, cause the processor 70 to implement various functional applications and data processing of the electronic device, i.e., implements the network optimization method described above.

The memory 71 may mainly include a program storage area and a data storage area. The program storage area may store an operating system, and an application required by at least one function. The data storage area may store data created according to the use of the electronic device and the like. In addition, the memory 71 may include a high speed random access memory, and may also include a nonvolatile memory, e.g., at least one magnetic disk storage device, flash memory device, or other nonvolatile solid-state storage device. In some examples, the memory 71 may further include memories located remotely from the processor 70, and the remote memories may be connected to the electronic device via a network. Examples of the network include, but not limited to, the Internet, an intranet, a local area network, a mobile communication network, and combinations thereof.

The input apparatus 72 may be configured for receiving inputted numerical or character information, and generating a key signal input related to user settings and function control of the electronic device. The output apparatus 73 may include a display device such as a display screen.

According to an embodiment of the present application, a storage medium containing a computer-executable instruction is also provided. The computer-executable instruction, when executed by a processor of a computer, causes the processor to implement a network optimization method, the method including: sending a data analytics request information to a core network; receiving data analytics response information fed back by the core network and determining a model processing result according to an artificial intelligence learning model; and performing a network optimization operation according to the model processing result; or sending a data information request to a base station; receiving a data information response fed back by the base station, and determining a model processing result according to an artificial intelligence learning model; and performing a network optimization operation according to the model processing result.

From the above detailed description of the embodiments, those having ordinary skills in the art can clearly understand that the present application can be implemented by software and necessary general-purpose hardware, and of course can also be implemented by hardware, but in many cases, the former is a better implementation. Based on such an understanding, the technical schemes of the present application essentially or the part contributing to existing technologies may be embodied in the form of a software product. The computer software product may be stored in a computer-readable storage medium such as a floppy disk, a Read-Only Memory (ROM), a Random Access Memory (RAM), a flash memory, a hard disk, an optical disc, etc., of a computer, and includes several instructions for instructing a computer device (which may be a personal computer, a server, a network device, or the like) to execute the methods described in the embodiments of the present application.

It should be noted that the units and modules included in the above apparatus embodiments are divided according to a functional logic only, and are not limited to the above division, as long as the corresponding functions can be realized. In addition, the names of the functional units are merely for the convenience of distinguishing from each other, and are not intended to limit the protection scope of the present application.

Those having ordinary skills in the art can understand that all or some of the steps in the methods disclosed above and the functional modules/units in the system and the apparatus can be implemented as software, firmware, hardware, and appropriate combinations thereof.

In a hardware implementation, the division of the functional modules/units mentioned in the above description does not necessarily correspond to the division of physical components. For example, one physical component may have multiple functions, or one function or step may be jointly executed by several physical components. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer readable instructions, data structures, program modules, or other data). The computer storage medium includes, but not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and which can be accessed by a computer. In addition, as is known to those having ordinary skills in the art, the communication medium typically includes computer-readable instructions, data structures, program modules, or other data in a modulated data signal such as a carrier or other transport mechanism, and can include any information delivery medium.

Although some embodiments of the present application are described above with reference to the accompanying drawings, these embodiments are not intended to limit the protection scope of the present application. Any modifications, equivalent replacements and improvements made by those having ordinary skills in the art without departing from the scope and essence of the present application shall fall within the protection scope of the present application.

What is claimed is:

1. A network optimization method, performed by a network optimization apparatus, comprising:
   sending data analytics request information to a core network;
   receiving data analytics response information fed back by the core network and determining a model processing result according to an artificial intelligence learning model;
   performing a network optimization operation according to the model processing result; and
   training or updating the artificial intelligence learning model according to the data analytics response information.

2. The method of claim 1, further comprising:
   performing the network optimization operation according to the data analytics response information.

3. The method of claim 1, wherein the data analytics response information is determined in the core network through at least one of data collection, data statistics and analytics, or data prediction according to the data analytics request information.

4. The method of claim 1, wherein the data analytics request information comprises at least one of:
   at least one analytics data type identifier, at least one data analytics form identifier, at least one user equipment (UE) identifier, data analytics time information, an area of interest for data analytics, or an expected UE trajectory information granularity.

5. The method of claim 4, wherein the at least one analytics data type identifier comprises at least one of: a UE data type identifier, a network load data type identifier, a quality of experience data type identifier, a network slice data type identifier, or a general data type identifier.

6. The method of claim 4, wherein the at least one data analytics form identifier comprises at least one of: a data statistics identifier, or a data prediction identifier.

7. The method of claim 4, wherein the data analytics time information comprises at least one of: a time granularity, a data analytics start time, or a data analytics end time.

8. The method of claim 4, wherein the area of interest for data analytics comprises at least one of: a tracking area, a cell list, or a paging area.

9. The method of claim 4, wherein the expected UE trajectory information granularity comprises at least one of: a tracking area level, a cell level, or a geographic location level.

10. The method of claim 1, wherein the data analytics response information comprises at least one of: UE mobility statistics information, UE mobility prediction information, network load statistics information, network load prediction information, or general data statistics information.

11. A network optimization method, performed by a network optimization apparatus, comprising:
    sending a data information request to a base station;
    receiving a data information response fed back by the base station, and determining a model processing result according to an artificial intelligence learning model;
    performing a network optimization operation according to the model processing result; and
    sending the data information request to the base station, to cause the base station to train or update a second artificial intelligence learning model.

12. The method of claim 11, further comprising:
    performing the network optimization operation according to the data information response.

13. The method of claim 11, wherein the data information response is determined by the base station through at least one of data collection, data statistics and analytics, or data prediction according to the data information request.

14. The method of claim 11, wherein the data information request comprises at least one of:
- at least one analytics data type identifier, at least one data analytics form identifier, at least one user equipment (UE) identifier, data analytics time information, an area of interest for data analytics, or an expected UE trajectory information granularity.

15. An electronic device, comprising:
one or more processors; and
a memory, configured for storing one or more programs,
wherein the one or more programs, when executed by the one or more processors, cause the one or more processors to perform a network optimization method, the method comprising:
sending data analytics request information to a core network;
receiving data analytics response information fed back by the core network and determining a model processing result according to an artificial intelligence learning model;
performing a network optimization operation according to the model processing result; and
training or updating the artificial intelligence learning model according to the data analytics response information.

* * * * *